United States Patent [19]
Evequoz

[11] 3,894,746
[45] July 15, 1975

[54] SKI-BOB

[76] Inventor: Jean-Yves Evequoz, 17, route de la Dixence, Sion, Switzerland

[22] Filed: Feb. 13, 1974

[21] Appl. No.: 442,203

Related U.S. Application Data

[62] Division of Ser. No. 260,027, June 2, 1972, Pat. No. 3,858,896.

[52] U.S. Cl.................................. 280/16; 280/25
[51] Int. Cl............................................. B62b 13/04
[58] Field of Search................ 280/16, 25; 180/5 R

[56] References Cited
UNITED STATES PATENTS 3,525,411  8/1970  Hagen.................... 280/25 X
3,635,488  1/1972  Bauer....................... 280/25

Primary Examiner—Robert R. Song
Attorney, Agent, or Firm—Raymond A. Robic; Arthur Schwartz

[57] ABSTRACT

A ski-bob includes a chassis, a steerable front ski, and two rear skis connected independently to the chassis by two suspension devices. Each suspension device includes at least one pair of arms pivotally interconnected together and pivotally connected to the rear ski and to the chassis about transverse axes, and torsion operating shock absorbing members acting between the parts pivotally connected together about at least two of these axes.

3 Claims, 4 Drawing Figures

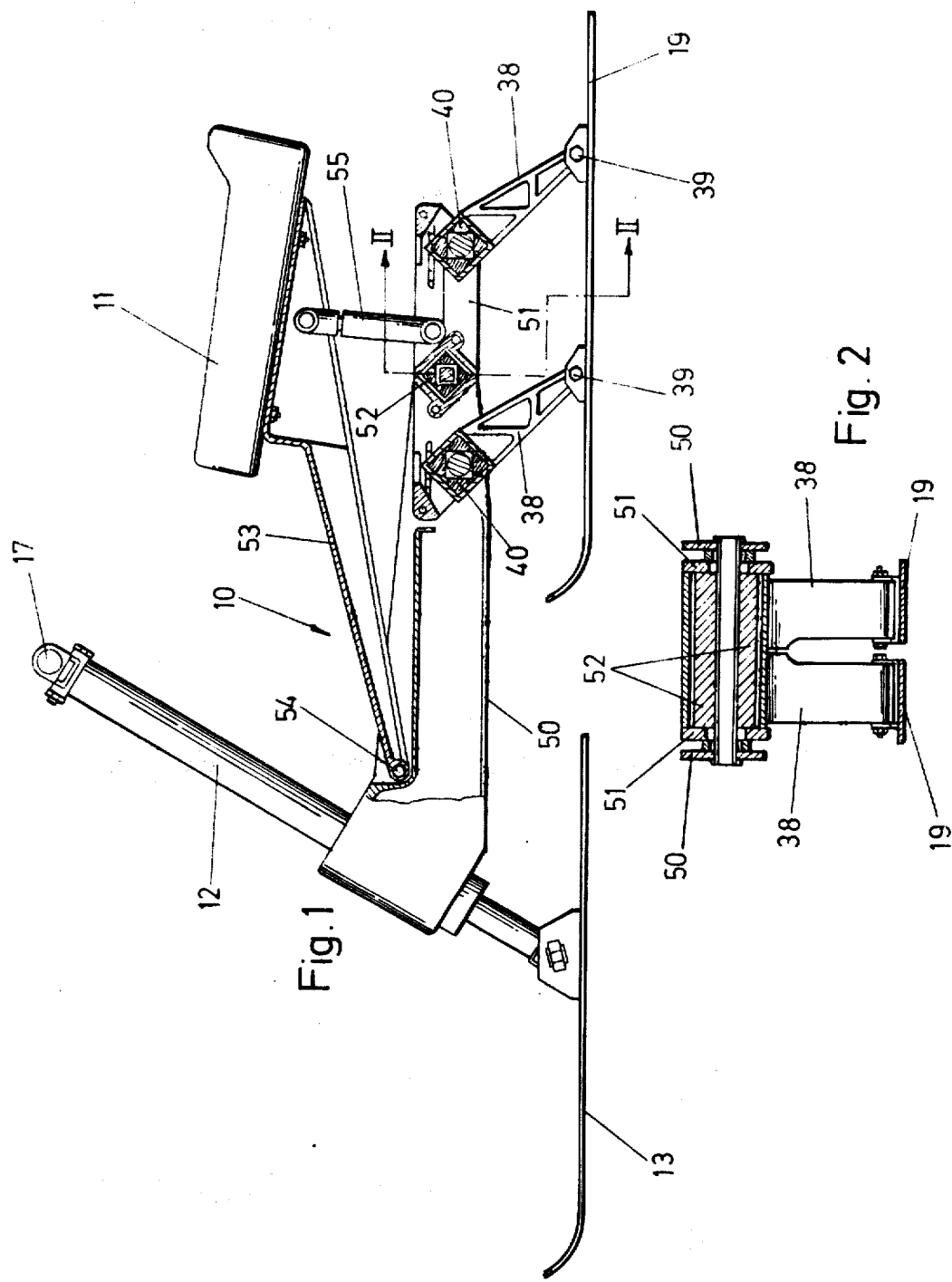

SKI-BOB

This is a division of application Ser. No. 260,027, filed June 2, 1972 now U.S. Pat. No. 3,858,896.

The invention relates to ski-bobs, sometimes referred to as ski cycles.

According to the invention, a ski-bob comprises a chassis, a steerable front ski, and two rear skis connected independently to the chassis by two suspension devices, each suspension device including two arms pivotally interconnected together about a first transverse axis one arm being pivotally connected to the chassis about a second transverse axis, and the other arm being pivotally connected to a rear ski about a third transverse axis, and two torsion-operating shock absorbing members acting between the parts pivotally connected together at two of said three axes.

Embodiments of the invention will now be particularly described, by way of example, with reference to the accompanying drawings, in which:

FIG. 1 is a side-elevational view of a first embodiment, partially in cross-section through a median plane;

FIG. 2 is a cross-section taken along line II—II of FIG. 1;

Figure 4:
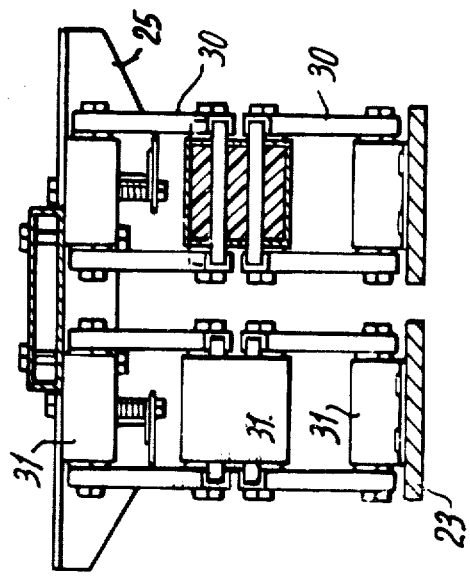
FIG. 4 is a cross-section taken along line II—II of FIG. 3.

The ski-bob shown in FIGS. 1 and 2 comprises a streamlined chassis 10, a seat 11, a steering column 12, a steerable front ski 13, a steering bar 17, and two rear skis 19.

The steering column 12, which has not been shown in detail, includes two telescopic tubes connected together about a shock absorbing spring.

The chassis 10, provided in sectioned metal bars, includes a main body 50, at a front end of which the steering column 12 is pivotally mounted, and a rigid support arm 51 pivotally mounted on a rear part of the body 50 about a torsion operating shock absorbing member 52.

The rear skis 19 are connected to the support arm 51 by four arms 38 pivotally connected at lower ends thereof to the skis 19 about transverse shafts 39 and pivotally connected at upper ends thereof to the support arm 51 by means of torsion operating shock absorbing members 40 on either side of the member 52. The spacing between the shafts 39 is equal to that between the axes of members 40, so that each ski 19 together with its pair of arms 38 and support arm 51 forms an elastically deformable parallelogram.

The seat 11 is carried by a lever 53 pivotally connected to the front part of body 50 about a transverse pin 54, and supported on the support arm 51 by a telescopic shock absorber 55.

The described ski-bob has the advantage that the deformable parallelogram associated with each rear ski 19 may itself pivot relative to the chassis 10 about the transverse axis of member 52, which enables the rear skis to better adapt to the track, particularly over bumpy parts thereof.

Figure 3:
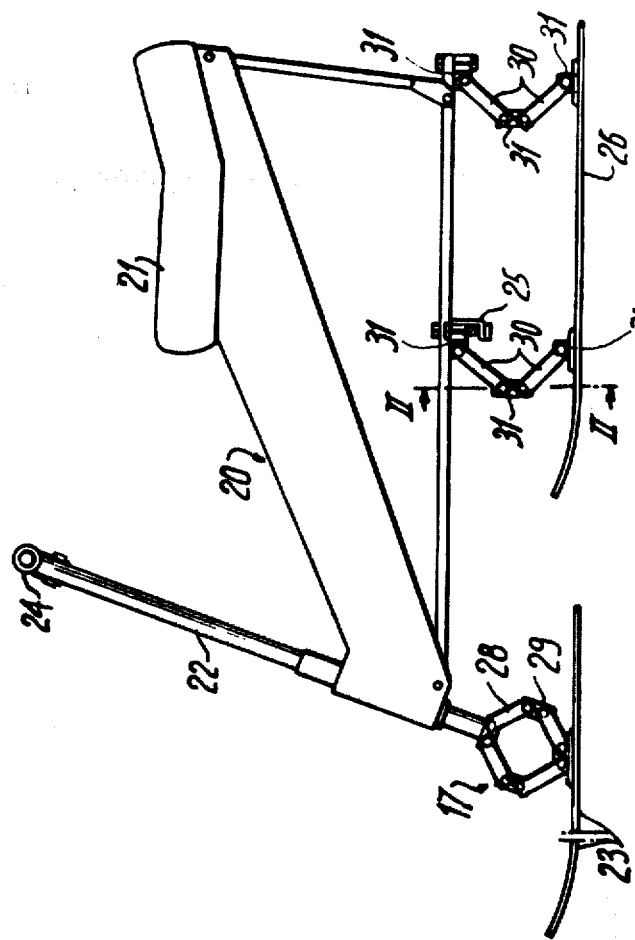
FIG. 3 is a side-elevational view of the second embodiment.

The ski-bob shown in FIGS. 3 and 4 includes a streamlined chassis 20, a steering column 22 pivotally mounted at a front end of the chassis 20, a steerable front ski 23, a steering bar 24, two foot rests 25 protruding from opposite sides of a lower bar of the chassis 20, and two rear skis 26.

The front ski 23 is connected to the steering column 22 by an elastic suspension device including four arms 28 pairs of which are pivotally interconnected together about torsion operating shock absorbing members 29, the four arms forming a deformable quadrilateral which may be deformed by pivoting about generally transverse axes.

The rear skis 26 are connected independently to the lower bar of the chassis 20 by two suspension devices each including two pairs of arms 30 pivotally interconnected together about torsion operating shock absorbing members 31 arranged to pivot about transverse axes, The upper arms 30 are pivotally connected to the lower bar of chassis 20 about the transverse axes of torsion operating shock absorbing members 31, and the lower arms are connected to the rear skis 26 in a similar manner.

The latter described ski-bob has the advantage that the rear skis 26 can take different inclinations relative to the chassis 20 and are therefore able to independently adapt to inequalities of the track.

What is claimed is:

1. A ski-bob comprising:
   a. a chassis including a main body and a support arm,
   b. a steerable front ski connected to said chassis,
   c. two rear skis, each rear ski being independently connected to said chassis by a pair of suspension devices,
   d. each suspension device comprising a pair of unitary arms of substantially equal length and being pivotally connected at one end to said chassis about first spaced apart substantially transverse axes and being pivotally connected at the other end to a rear ski about second spaced apart substantially transverse axes,
   e. a torsion shock absorbing means connected to each suspension device at one of said axis,
   f. said main body supporting said front ski and the forward pair of suspension devices,
   g. said support arm supporting the rearward pair of suspension devices, and
   h. said main body and said support arm being pivotally connected together.

2. A ski-bob as defined in claim 1 wherein said torsion shock absorbing means is at the end connected to said chassis.

3. A ski-bob as defined in claim 1 including a torsion operated shock absorbing member positioned between said main body and said support arm.

* * * * *